US010846088B2

(12) United States Patent
Underwood et al.

(10) Patent No.: US 10,846,088 B2
(45) Date of Patent: Nov. 24, 2020

(54) CONTROL OF INSTRUCTION EXECUTION IN A DATA PROCESSOR

(71) Applicant: Arm Limited, Cambridge (GB)

(72) Inventors: Mark Underwood, Cambridge (GB); Hakan Lars-Goran Persson, Bjarred (SE); Arne Aas, Trondheim (NO)

(73) Assignee: Arm Limited, Cambridge (GB)

( * ) Notice: Subject to any disclaimer, the term of this patent is extended or adjusted under 35 U.S.C. 154(b) by 121 days.

(21) Appl. No.: 16/107,250

(22) Filed: Aug. 21, 2018

(65) Prior Publication Data

US 2020/0065095 A1 Feb. 27, 2020

(51) Int. Cl.
*G06F 15/00* (2006.01)
*G06F 9/30* (2018.01)
*G06F 9/38* (2018.01)

(52) U.S. Cl.
CPC .......... *G06F 9/3016* (2013.01); *G06F 9/3842* (2013.01); *G06F 9/3851* (2013.01)

(58) Field of Classification Search
CPC ..... G06F 9/3016; G06F 9/3842; G06F 9/3851
USPC ........................................................ 712/208
See application file for complete search history.

(56) References Cited

U.S. PATENT DOCUMENTS 5,583,804 A * 12/1996 Seal ...................... G06F 7/5443
708/523

\* cited by examiner

*Primary Examiner* — Chun Kuan Lee
(74) *Attorney, Agent, or Firm* — Vierra Magen Marcus LLP

(57) ABSTRACT

When executing a program on a data processor comprising an execution unit for executing instructions in a program to be executed by the data processor, the execution unit being associated with one or more hardware units operable to execute instructions, at least one instruction in a program is associated with an indication of whether the instruction should be issued directly for execution by a hardware unit or should be intercepted during its execution by the execution unit. The execution unit then, when decoding the instruction for execution by a hardware unit in the program, determines from the indication associated with the instruction whether the instruction should be issued directly for execution by a hardware unit or intercepted during its execution by the execution unit, and issues the instruction for execution by a hardware unit directly, or pauses execution of the instruction and performs another operation, accordingly.

19 Claims, 5 Drawing Sheets

CONTROL OF INSTRUCTION EXECUTION IN A DATA PROCESSOR

BACKGROUND

The technology described herein relates to a method of and apparatus for controlling the execution of instructions by data processors, and in particular to a mechanism for facilitating the dynamic interception and special treatment of particular instructions during program execution.

Many data processors include programmable processing units and/or stages that are operable to execute programs comprising sequences of instructions to perform operations. The programs may be to perform actual data processing operations, such as in the case of graphics processor shader program execution. In other cases, the program may be to control the operation of the data processor, such as a graphics processor, such as in the case where a graphics processor's operation is controlled by means of executing command streams that comprise sequences of instructions which when executed will configure and trigger graphics processor processing tasks.

Data processors that are operable to execute programs will include an appropriate execution unit or units operable to execute instructions in a program to be executed. The execution unit will include, for example, appropriate instruction fetch and decode circuitry, and be operable to generate control signals for one or more associated hardware units (functional units) for directly (natively) executing instructions in a program. The execution unit may also have an associated more general processing unit, such as a microcontroller, that can emulate instruction execution in software. This may be used, for example, for executing less common instructions, to avoid having to provide appropriately dedicated hardware units able to execute such less common instructions natively.

The Applicants believe that there remains scope for improvements to the execution of instructions during program execution by a data processor.

BRIEF DESCRIPTION OF THE DRAWINGS

A number of embodiments of the technology described herein will now be described by way of example only and with reference to the accompanying drawings, in which.

DETAILED DESCRIPTION

Figure 1:
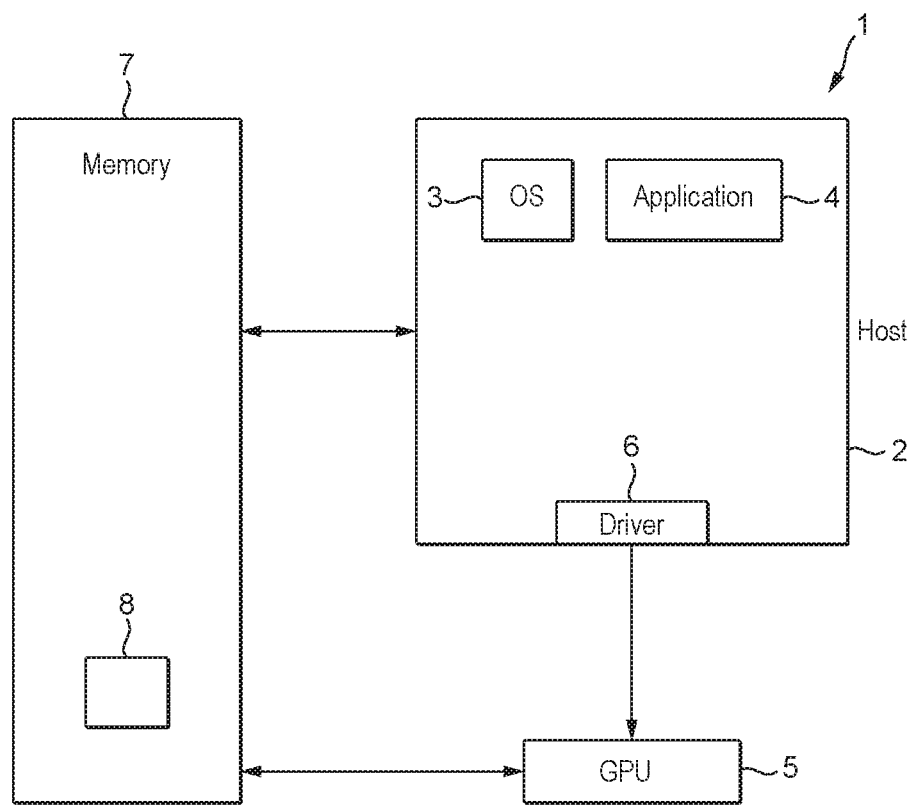
FIG. 1 shows an exemplary graphics processing system of an embodiment of the technology described herein.

A first embodiment of the technology described herein comprises a method of operating a data processor when executing a program comprising a sequence of instructions, the data processor comprising an execution unit for executing instructions in a program to be executed by the data processor, the execution unit being associated with one or more hardware units operable to execute instructions, and being operable to fetch and decode instructions for execution by the hardware unit or units, the method comprising:

for a program comprising a sequence of instructions to be executed by the execution unit of the data processor:
associating with at least one instruction in the program that may be executed on a hardware unit, an indication of whether the instruction should be issued directly for execution by a hardware unit or should be intercepted during its execution by the execution unit;
and
the execution unit:
when decoding the instruction for execution by a hardware unit in the program, determining from the indication associated with the instruction whether the instruction should be issued directly for execution by a hardware unit or intercepted during its execution by the execution unit;
and
in response to the determination, either:
issuing the instruction for execution by a hardware unit directly; or
pausing execution of the instruction and performing another operation.

A second embodiment of the technology described herein comprises a data processor, the data processor comprising:
an execution unit for executing instructions in a program to be executed by the data processor;
one or more hardware units associated with the execution unit and operable to execute instructions under the control of the execution unit;
the execution unit further comprising:
instruction fetch circuitry operable to fetch instructions for execution by the hardware unit or units; and
instruction decode circuitry operable to decode instructions for execution by the hardware unit or units;
and wherein the instruction decode circuitry of the execution unit is configured to:
when decoding an instruction for execution by a hardware unit associated with the execution unit:
determine whether the instruction has associated with it an indication of whether the instruction should be issued directly for execution by a hardware unit or should be intercepted during its execution by the execution unit;
and to, when it is determined that the instruction has associated with it an indication of whether the instruction should be issued directly for execution by a hardware unit or should be intercepted during its execution by the execution unit;
determine from the indication whether the instruction should be issued directly for execution by a hardware unit or intercepted during its execution by the execution unit; and to
in response to that determination, either:
issue the instruction for execution by a hardware unit directly; or
pause execution of the instruction and perform another operation.

In the technology described herein, program instructions that can in the normal course be issued directly to a hardware unit for execution can be associated with an indicator to indicate that they should be "intercepted" during program execution. If an instruction is to be intercepted, it is not then issued for execution on a hardware unit, but rather, the instruction execution is paused and some other operation is performed.

As will be discussed further below, this then facilitates the identification and interception of specific instructions during program execution in a dynamic manner, for example (and in an embodiment) to allow instructions of a particular type to be handled in a special manner (when desired).

The Applicants have recognised in this regard that there may be situations where it is desirable not to execute an instruction on a hardware unit in the normal manner, and, moreover, that such situations can arise dynamically in use, for example during program execution.

An example of this may be where the operation that an instruction performs requires access to or makes use of particular resources (e.g. hardware units) of a data processor that may be being shared with other programs that are being executed, such that at the time an instruction falls to be executed, the required resources may not actually be available for the program in question.

The technology described herein facilitates dynamically intercepting such situations and handling programs and instructions for which resources may not be available at the time in a different (and, e.g., more appropriate) manner, by allowing instructions to be dynamically indicated as to be intercepted and not be issued directly for execution on a hardware unit when they fall to be executed.

Furthermore, because the indicators are provided for respective instructions, the indication and identification of such "special case" instructions can be done, for example, on a per instruction (or at least on a per instruction type) basis, thereby facilitating more fine grained control of the program execution.

Moreover, in the technology described herein, the check of whether an instruction should be "intercepted" and not issued directly for execution on a hardware unit is performed in the decode path of the execution unit (i.e. when decoding an instruction for sending for execution on a hardware unit).

The effect of this then is that the overhead of the "special case" handling indication for an instruction is very low to non-existent when an instruction is simply to be issued directly for execution on the hardware unit in the normal manner (i.e. when the instruction interception and special case handling operation is disabled). This is in contrast, e.g., to arrangements which trigger special handling of instructions by including breakpoints or traps in the program code itself (which accordingly requires extra program code to run, and potentially extra memory accesses, even in the case where special case handling is not required (disabled)).

The technology described herein accordingly provides a mechanism for dynamically intercepting, and handling in an alternative manner, instructions in a program being executed, but which has low overhead, particularly in its disabled state. This may be particularly beneficial, for example, for performance sensitive applications.

As will be discussed further below, the technology described herein can also facilitate generating performance information (e.g. statistics) (such as for use for debugging purposes) without the need to explicitly include instructions in a program for that purpose (by, e.g., indicating that particular instructions in the program should be intercepted and handled in a different manner, to thereby trigger, for example, the output of the appropriate performance information when those instructions are encountered).

The data processor that the technology described herein is used in can be any suitable and desired data processor that includes an execution unit operable to execute programs. In an embodiment, the data processor is a graphics processor (graphics processing unit (GPU)), but it could also be other forms of processor, such as a CPU, display processor, video processor, an image signal processor (ISP), a digital signal processor (DSP), etc., if desired.

The execution unit of the data processor can be any suitable and desired execution unit that can execute instructions in a program to be executed by the data processor.

The hardware unit or units that are associated with the execution unit and that are operable to execute the instructions may correspondingly be any suitable and desired hardware units, such as appropriate arithmetic units, load and store units, or any other suitable and desired functional unit. There is in an embodiment more than one hardware unit.

The hardware units may be part of the execution unit, and/or, e.g., separate to it but controllable by it (and in an embodiment operable to receive control signals directly from the execution unit). Correspondingly, issuing an instruction for execution by a hardware unit directly may comprise issuing the instruction for execution by (and executing the instruction by) the execution unit (by a hardware unit of the execution unit) directly, or issuing the instruction for execution by (and executing the instruction by) a hardware unit that is under the control of the execution unit.

The execution unit is operable to fetch and decode instructions for execution using the hardware unit or units (and comprises appropriate instruction fetch and instruction decode circuitry for that purpose).

The instruction fetch circuitry and process can operate in any suitable and desired manner, such as, and in an embodiment, in the normal manner for the data processor in question. In an embodiment, the instructions are fetched for execution by the execution unit from an instruction cache, and thus the data processor in an embodiment also comprises an appropriate instruction cache.

The instruction decode circuitry and process can correspondingly operate in any suitable and desired manner to decode instructions for execution using the hardware unit or units. Thus the instruction decode circuitry is in an embodiment operable to, for example, determine the operations to be performed by an instruction, e.g., and in an embodiment, based on an opcode included in the instruction, and the operand or operands to be processed and/or output by the instruction (again, e.g., and in an embodiment, based on operand indicators included in the instruction). The instruction decode circuitry could also correspondingly be, and is in an embodiment, operable to (configured to) map the operations, etc., required by the instruction to appropriate signals for triggering the hardware unit or units to perform the required operations (to execute the instruction).

In addition to the decoding operation, the instruction decode circuitry and process of the technology described herein is further operable to, as discussed above, determine from indications that may be associated with instructions, whether the instructions should be issued directly for execution using a hardware unit of the data processor or intercepted during their execution by the execution unit.

To facilitate this operation, as discussed above, instructions in a program to be executed can be, and are in an embodiment, associated with an indication of whether the instructions should be issued directly for execution by a hardware unit or should be intercepted during their execution by the execution unit.

Such an indication could be associated with a single instruction in a program to be executed only, but in an embodiment, such indications can be, and are in an embodiment, associated with plural instructions in a program to be executed (and may, e.g., be associated with some or all of the instructions in a program to be executed). Correspondingly, some instructions in a program may have associated indications and some instructions may not.

In an embodiment, the indications can be, and are in an embodiment, associated with particular types of instructions. Thus, in an embodiment, an indication can be provided for a particular instruction type, such that then all instructions of that type will have the same associated indication (and correspondingly be treated in the same way when executing the program, based on the indication associated with that instruction type).

In this case an indication could be associated with only a single instruction type, or there may be plural instruction types that each have respective indications associated with them. Correspondingly, indications could be associated with only some but not all of the types of instruction that may executed by the execution unit (and in an embodiment, this is the case).

Thus, in an embodiment, the technology described herein comprises associating with each of one or more (and in an embodiment each of plural) types of instruction that may be executed on the hardware unit(s), a (respective) indication of whether instructions of that type should be issued directly for execution by a hardware unit or should be intercepted during their execution by the execution unit (with the instruction execution path in the execution unit (and in particular the instruction decode process) then operating to handle instructions of the respective instruction type accordingly).

Thus, in an embodiment, one or more and in an embodiment each type of instruction that can be executed by the execution unit has a corresponding indication (indicator) associated with it that can be set to indicate of whether instructions (of that type) should be issued directly for execution by a hardware unit or should be intercepted during their execution by the execution unit.

In this case, only a single type of instruction or plural types of instruction, or all possible types of instruction, could have respective indications associated with them. In an embodiment, instructions (types of instruction) that are to be executed on and that require hardware resources of the data processor can, and in an embodiment do, have "intercept" indications associated with them. Additionally or alternatively, instructions that perform, and/or that trigger the performance of, processing tasks in an embodiment can, and in an embodiment do, have "intercept" indications associated with them.

In one embodiment, "run" instructions (instructions that are operable to trigger a processing task or tasks on the data processor) can, and in an embodiment do, have "intercept" indications associated with them. Run instructions may be, and in an embodiment are, set to be intercepted for, for example, resource scheduling and/or debugging/instrumentation (e.g. capturing some or all of the state vector for the run command (e.g. its input parameters)) purposes.

In an embodiment, load/store instructions can also or instead, and in an embodiment also, have "intercept" indications associated with them. This may be in particular for debugging and/or instrumentation (e.g. capturing values loaded/stored to/from memory) purposes.

In one embodiment, all instruction types can, and in an embodiment do, have "intercept" indications associated with them. This may be used, for example, for debugging and/or instrumentation (e.g. counting the number of each type of instruction) purposes. It could also or instead be used for changing behaviour as part of a hardware fault/error "work around" (e.g. where there is some bug in the implementation of a particular instruction type) (which could then be worked around in software/firmware by stopping the execution unit executing instructions of a given type in hardware and having firmware and/or software running on another processor emulate/implement instructions of that type instead).

Other arrangements would, of course, be possible.

The indications that indicate whether an instruction (or type of instruction) should be intercepted or sent directly for execution on a hardware unit can take any suitable and desired form. In an embodiment, they are in the form of a flag (a bit) that can be set to indicate that the instruction, or type of instruction, should be intercepted (with the instruction then being sent directly for execution on a hardware unit if the "intercept" flag is not set) (or vice-versa). Thus, in an embodiment, the indications have two values, one which indicates that the instruction should be intercepted, and one that indicates that the instruction should be sent directly for execution on a hardware unit.

The indication(s) can be associated with an instruction (and an instruction type) in any suitable and desired manner. In an embodiment, the indication is associated with a respective identifier for the instruction (for the instruction type). In an embodiment the identifier is associated with the opcode for the instruction (such that, e.g., and in an embodiment, the opcode can then be used to look up the "intercept" indication for the instruction type in question).

Thus, in an embodiment, the method of the technology described herein comprises (and the instruction decode circuitry is correspondingly configured to), when decoding an instruction for execution by a hardware unit of the execution unit, determining from an identifier (e.g. and in an embodiment, the opcode) determined for the instruction when decoding the instruction, whether the instruction has an indication associated with it that indicates that the instruction should be intercepted during its execution by the execution unit or not (with the execution unit then acting accordingly).

Correspondingly the technology described herein in an embodiment comprises associating with respective identifiers for one or more instructions that may be executed on a hardware unit of the execution unit, an indication that can be set to indicate of whether instructions (of that type) should be issued directly for execution by a hardware unit or should be intercepted during their execution by the execution unit.

Thus, in an embodiment, a table of instruction identifiers (e.g. and in an embodiment instruction opcodes) together with associated "intercept" indications is maintained (and can be set in use), which table is then checked when decoding instructions for execution by hardware units of the execution unit, to determine whether instructions to be executed should be "intercepted" or not.

The instruction "intercept" indications can be provided to the execution unit for checking when executing a program in any suitable and desired manner. In an embodiment, the indications (e.g. in association with the corresponding instruction type identifiers, such as opcodes) are stored so as to be accessible to the execution unit when executing a program, and in an embodiment in suitable local storage of and/or accessible to the execution unit. In an embodiment, the indication information is stored in a set of registers, and in an embodiment control registers, of and/or accessible to the execution unit, with the execution unit then being operable to look up the respective indication values, e.g., and in an embodiment, based on the opcode for an instruction, in the registers in use.

Other arrangements would, of course, be possible.

The instruction intercept indications for the instructions can be set at any suitable and desired stage and by any suitable and desired unit, processor, etc. of or for the data processor, and/or data processing system that the data processor is part of.

In one embodiment, the instruction "intercept" indications are set before the program is provided to the data processor for execution, e.g., and in an embodiment, as part of the program preparation that is performed on another processor, such as a host processor, that is controlling the operation of the data processor.

In this case, the intercept indications could be set by some other processor of the overall data processing system that the data processor is part of, such as a central processing unit (CPU), such as a host processor, of the data processing system, that is generating and providing the program for execution by the data processor.

For example, and in an embodiment, a driver for the data processor could be operable to, and in an embodiment is operable to, set the instruction intercept indicators for particular instruction types for a program that it is sending to the data processor for execution, and to provide the appropriate indications in association with the instruction identifiers (e.g.) to the data processor together with, e.g., and in an embodiment, the compiled program code for execution.

This may be appropriate where, for example, the operation in the manner of the technology described herein is to be used for providing performance information, e.g., for debugging and/or performance monitoring purposes, as in that case the, e.g. driver, can then indicate where and when the performance information should be provided during execution of the program.

In this case, the driver itself could, e.g., set the intercept indications, or there may be some indirection between the driver (the host) and the intercept indications, e.g. with the driver (the host) requesting a controller on the data processor itself to set the intercept indications in the required manner.

In an embodiment, the intercept indications for instructions can be, and are, set by the data processor (that is executing the program) itself. This would then allow, e.g., the data processor to vary the handling of instructions in a program in use, e.g. before and/or during program execution, e.g., in response to dynamic changes in program execution conditions within the data processor, such as, and in an embodiment, hardware and/or functional units and other resources of the data processor being available and/or unavailable and/or becoming unavailable and/or becoming available before and/or during program execution.

Thus, in an embodiment, the data processor further comprises processing circuitry operable to associate with instructions in a program to be executed by the execution unit of the data processor, an indication of whether the instruction should be issued directly for execution by a hardware unit or should be intercepted during its execution by the execution unit.

The technology described herein also extends to the data processor dynamically setting the indications to signify that instructions should be intercepted during program execution in its own right.

Thus, a further embodiment of the technology described herein comprises a method of operating a data processor when executing a program comprising a sequence of instructions, the data processor comprising an execution unit for executing instructions in a program to be executed by the data processor, the execution unit being associated with one or more hardware units operable to execute instructions, and being operable to fetch and decode instructions for execution by the hardware unit or units, the method comprising:

the data processor, when executing a program comprising a sequence of instructions to be executed by the execution unit of the data processor:

setting for at least one instruction in the program that may be executed on a hardware unit, an indication that the instruction should be intercepted during its execution by the execution unit;

and the execution unit:

determining from the indication associated with the instruction that the instruction should be intercepted during its execution by the execution unit;

and in response to the determination:

pausing execution of the instruction and performing another operation.

Another embodiment of the technology described herein comprises a data processor, the data processor comprising:

an execution unit for executing instructions in a program to be executed by the data processor;

one or more hardware units associated with the execution unit and operable to execute instructions under the control of the execution unit;

the data processor further comprising:

processing circuitry operable to, when the data processor is executing a program comprising a sequence of instructions to be executed by the execution unit of the data processor, set for an instruction in the program that may be executed on a hardware unit, an indication that the instruction should be intercepted during its execution by the execution unit;

and wherein the execution unit is configured to:

when an instruction for execution by a hardware unit associated with the execution unit has associated with it an indication that the instruction should be intercepted during its execution by the execution unit, pause execution of the instruction and perform another operation.

As will be appreciated by those skilled in the art, these embodiments of the technology described herein can, and in an embodiment do, include any one or more or all of the features of the technology described herein, as appropriate.

Thus, for example, the execution unit in an embodiment comprises instruction fetch circuitry operable to fetch instructions for execution by the hardware unit or units; and instruction decode circuitry operable to decode instructions for execution by the hardware unit or units; and in an embodiment determines from the indication of whether the instruction should be issued directly for execution by a hardware unit or should be intercepted during its execution by the execution unit associated with the instruction, whether the instruction should be issued directly for execution by a hardware unit or intercepted during its execution by the execution unit; and in response to the determination, either: issues the instruction for execution by a hardware unit directly; or pauses execution of the instruction and performs another operation.

In these embodiments of the technology described herein, the data processor can determine whether to set an intercept indication for an instruction based on any suitable and desired criteria and/or conditions.

In an embodiment, the data processor determines whether to set (and sets) an intercept indication for an instruction based on current operating conditions of the data processor, such as, and in an embodiment, one or more of: the (current) availability of (processing or other) resources on the data processor; other processing tasks being performed by the data processor; and other programs being executed by the data processor.

Thus, in an embodiment, the data processor is operable to monitor current operating conditions of the data processor, such as the availability of resources on the data processor, and to set instruction intercept indications for instructions and/or instruction types in response to that monitoring.

In these embodiments of the technology described herein, the data processor could set the indications to indicate whether instructions should be intercepted or not in advance of the program execution, if desired (and in an embodiment this is what is done).

In an embodiment, the data processor can, and in an embodiment does, set the indications for indicating the interception of instructions dynamically in use, and in particular during execution of the program to which the instruction handling will be applied. This will then allow, for example, and in an embodiment, the handling of a particular instruction and/or instruction type to be changed (from sending directly for execution on the hardware unit to be intercepted and (potentially) handled in another way, or vice-versa) during execution of a program. In an embodiment, the indicator to indicate that an instruction should be intercepted can be set (and unset) at any point during program execution.

Thus, in an embodiment, the data processor is able to and is operable to, change the indication of whether instructions of a particular type (e.g.) should be sent directly for execution on a hardware unit or should be intercepted, during execution of the program (that includes the instructions) itself (and the method of the technology described herein correspondingly comprises changing, during execution of a program, the indication of whether instructions of a particular type should be sent directly for execution on a hardware unit or should be intercepted).

Where the data processor is operable to set the intercept indications for instructions, then that can be done by any suitable and desired component or unit of the data processor.

In an embodiment, the data processor further comprises a controller processing unit operable to control the operation of the execution unit, and that controller processing unit is operable to set the instruction intercept indications. The controller processing unit may comprise, for example, a suitable processor, such as a microcontroller (MCU), that is associated with the execution unit.

Other arrangements would, of course, be possible.

The execution unit determines whether an instruction for execution by a hardware unit has been indicated as to be intercepted or not during the process of decoding the instruction for execution (thus after the instruction has been fetched for execution, e.g., and in an embodiment, from an instruction cache), and before actual execution of the instruction using a hardware unit(s) of the data processor).

The instruction decoding operation of the execution unit can comprise any suitable and desired decoding process that will, e.g., and in an embodiment, interpret an instruction (e.g. to determine the operations that it is to perform and the operands that are required for it), and map the instruction to appropriate control signals for the actual hardware (functional) units that will perform the operations required by the instruction and/or to fetch the operands for the instruction.

In an embodiment, the decoding operation of the execution unit is carried out in two phases, a first phase that decodes and interprets the identity of the instruction (the opcode for the instruction), and then a second decode phase that interprets other aspects of the instruction, such as identifying the operands required for the instruction.

In an embodiment, the determination of whether the instruction has been indicated as to be intercepted is performed after the first part of the decoding process (and in an embodiment after the identity (the opcode) for the instruction has been determined (decoded) (and in an embodiment after only the identity (the opcode) for the instruction has been determined)).

Other phases of the instruction decoding process, such as determining and fetching the operands could then either only be performed when it is determined that the instruction should be sent directly for execution on the hardware unit (and in one embodiment this is what is done), but in other cases it would, for example, be possible to continue with the instruction decoding whilst checking whether the instruction has been indicated as to be intercepted or not (i.e. such that further "phases" of the instruction decoding process could be performed concurrently with the "intercept" indicator check, if desired).

Other arrangements would, of course, be possible.

The determination of whether the indication for an instruction indicates that the instruction should be intercepted can be performed in any suitable and desired manner. In an embodiment, and as discussed above, the determined identifier (opcode) for the instruction is used, e.g., and in an embodiment, as an index, to look up a stored set of indications, to identify the status of the intercept indication for the instruction (for the instruction type) in question. As discussed above, in an embodiment this look up is performed in a set of appropriate control registers that store for each instruction (type) that is to be considered in this manner, the indication together with an identifier (such as, and in an embodiment, the opcode) for the instruction (type).

The technology described herein also extends to the operation of an execution unit performing the "instruction interception" determination when executing a program per se.

Thus, a further embodiment of the technology described herein comprises a method of operating an execution unit of a data processor when executing a program comprising a sequence of instructions, the execution unit being associated with one or more hardware units operable to execute instructions, and being operable to fetch and decode instructions for execution by the hardware unit or units, the method comprising:

for a program comprising a sequence of instructions to be executed by the execution unit:
  the execution unit:
  when decoding an instruction for execution by a hardware unit in the program, determining whether the instruction has associated with it an indication that the instruction should be intercepted during its execution by the execution unit;
  and
  in response to the determination, either:
  issuing the instruction for execution by a hardware unit directly; or
  pausing execution of the instruction and performing another operation.

Another embodiment of the technology described herein comprises an execution unit for a data processor, the execution unit being operable to execute instructions in a program to be executed by the data processor, and being associated with one or more hardware units operable to execute instructions under the control of the execution unit;

the execution unit comprising:

instruction fetch circuitry operable to fetch instructions for execution by an associated hardware unit or units; and instruction decode circuitry operable to decode instructions for execution by an associated hardware unit or units;

and wherein the instruction decode circuitry of the execution unit is configured to:

when decoding an instruction for execution by a hardware unit associated with the execution unit, determine whether the instruction has associated with it an indication that the instruction should be intercepted during its execution by the execution unit; and in response to the determination, either:

issue the instruction for execution by a hardware unit directly; or pause execution of the instruction and perform another operation.

As will be appreciated by those skilled in the art, these embodiments of the technology described herein can, and in an embodiment do, include any one or more or all of the features of the technology described herein described herein, as appropriate.

When the execution unit determines that an instruction should not be intercepted (should still be sent directly for execution on a hardware unit), the execution unit then issues the instruction for execution by a hardware unit directly (and, e.g., and in an embodiment, first completes any remaining instruction decoding that is still to be done in the case where the determination is performed before the instruction decoding has been completed).

In this case, any remaining instruction decoding and the instruction execution itself can, and in an embodiment does, proceed in the normal manner for the execution unit and data processor in question.

On the other hand, when the indication indicates that the instruction should be intercepted, the execution unit pauses execution of the instruction and another operation is performed.

The another operation that the execution unit performs can be any suitable and desired operation that is other than continuing (immediately) execution of the instruction. In an embodiment, the execution unit signals to a controller processing unit that it has encountered an instruction that has been indicated to be intercepted. Thus, the execution unit in an embodiment signals an interrupt to a controller processing unit.

In one embodiment, the controller processing unit that is signalled in this regard is an internal controller processing unit of the data processor, such as, and in an embodiment, a microcontroller, that is operable to control the operation of the execution unit (as discussed above).

Thus, in an embodiment the data processor comprises a controller processing unit operable to control the operation of the execution unit, and the another operation that is performed when an instruction should be intercepted during its execution by the execution unit comprises signalling to the controller processing unit that the instruction has been indicated to be other than sent directly for execution on a hardware unit.

In another embodiment, the controller processing unit is (also or instead) a controller processing unit that is external to the data processor, such as, for example, a central processing unit (e.g. a host processor) that is associated with the data processor.

In an embodiment, the controller processing unit that is signalled when an instruction is indicated to be intercepted is the same controller processing unit that is operable to set the intercept indications for the instructions. This then facilitates the controller processing unit that is setting the intercept indications then performing the appropriate action in response to an instruction that has been indicated as to be intercepted.

In response to the signal from the execution unit, the controller processing unit should, and in an embodiment does, take appropriate, in an embodiment particular, in an embodiment selected, in an embodiment predetermined, action (perform an appropriate, in an embodiment particular, in an embodiment selected, in an embodiment predetermined, operation) in response to the identification of an instruction for execution that has been indicated to not be sent for execution by a hardware unit of the data processor. This action (operation) could be, for example, and in an embodiment, to change the operating mode of the execution unit or to make some other change that affects the execution unit's execution flow.

In an embodiment, the controller processing unit pauses the execution of the program by the execution unit, and/or suspends execution of the program by the execution unit (and, e.g., saves the current execution state so that execution of the program can be resumed at a later time). The controller processing unit in an embodiment then itself, or triggers another processing unit to, take the required action (operation) for which the instruction was indicated to not be sent for execution by a hardware unit of the data processor, such as, for example, remapping data processor resources to the execution unit, and/or providing appropriate performance information relating to the operation of the execution unit when executing the program.

Once the desired action (operation) for which the instruction intercept indication was set has been performed, then the controller processing unit in an embodiment operates to cause the execution unit to continue its execution of the program. This could comprise, for example, and in an embodiment, one or more of: clearing the interrupt; restoring the previous operating mode; resuming execution of the program; and/or restoring the execution unit back to its normal operating state, etc.

Other arrangements would, of course, be possible.

The technology described herein can be used for any suitable and desired program that a data processor may execute. Thus, in the case of a graphics processor, for example, the technology described herein may be used for shader program execution, for example.

In an embodiment, the program that is being executed is a command stream that is being used to control the operation of the data processor, for example, and in an embodiment, to configure and trigger processing tasks on the data processor. In this case, the program being executed will be in the form of a "command stream" that will, in an embodiment, be executed by an appropriate execution unit (a command stream execution unit) on the data processor.

A command stream may, for example, contain commands (instructions) to set parameters for processing jobs (which commands may, e.g. be emulated by a supervising controller on the accelerator), as well as commands (instructions) to execute the processing jobs, e.g. using the data processor hardware units. The command stream execution unit can then work its way through the command stream, executing the commands (instructions) in the command stream, in turn, and performing, or causing the data processor hardware to perform, the operations indicated by the commands.

The "command stream" execution unit will correspondingly support typical instructions, such as arithmetic, load/store and control flow instructions, but also instructions relating to control of the data processor, e.g. to configure and trigger data processor processing tasks.

Thus, in an embodiment, the program that is being executed by the execution unit comprises a command stream for controlling operation of and on the data processor, and the execution unit comprises a command stream execution unit of the data processor.

In this case, the data processor is in an embodiment a graphics processor that is controlled through the execution of command streams, but the technology described herein could equally be used for other data processors whose operation is controlled through the execution of command streams, if desired.

The command stream will be a sequence of instructions (commands) to be executed by a "command stream" execution unit, which execution unit, will, in response to the instructions be operable to perform, for example, operations relating to control of the data processor, for example to configure and trigger processing tasks on the data processor.

Correspondingly, the controller processing unit (if present) in this case in an embodiment comprises a controller processing unit associated with the command stream execution unit, such as, and in an embodiment, a microcontroller (MCU) associated with the command stream execution unit, and that is, e.g., and in an embodiment, operable to emulate in software (at least) certain types of instructions that may be included in a command stream (rather than those instructions being executed directly on hardware functional units associated with the command stream execution unit).

Other arrangements would, of course, be possible.

In this case, the operation in the manner of the technology described herein is in an embodiment used to "intercept" particular forms of instructions in a command stream, such as, and in an embodiment, instructions that will trigger processing tasks of the data processor, and in particular that will require access to particular resources (hardware units) of the data processor. This could then be used by the controller processing unit on the data processor to trigger the interception of instructions (commands) in a command stream in the manner of the technology described herein when it knows that the appropriate data processing resources (e.g. hardware units) relating to those instructions are not currently available.

In this case, the controller processing unit is in an embodiment also operable to allocate data processor resources (hardware units) to respective command streams that are being executed, and to keep track of what resources a given command stream has been allocated and/or requires. The controller processor may then set the "intercept" indicators for particular commands for a command stream so as to intercept commands in a command stream for which the appropriate resources (hardware units) may not currently be available or allocated (and to, in response to intercepting such an instruction in a command stream, then pause and/or suspend execution of a command stream until the required resources are available (and re-allocate resources to a command stream if required)).

Thus, in an embodiment, the operation in the manner of the technology described herein is used when executing command streams relating to the control of the data processor, and a controller processing unit is operable to allocate respective data processing resources to command streams to be executed, and to determine whether a command stream to be executed has been allocated the required resources to execute its instructions, and to, when a command stream has not been allocated the appropriate resources to execute instructions of a given type, set the intercept indication for the instructions of that type in that command stream so as to be intercepted, with the controller processing unit in response to the interception of such an instruction then stopping execution of the command stream at the intercepted instruction and re-allocating processing resources of the data processor to the command stream in question, and then causing the execution unit to resume execution of the command stream at the intercepted instruction after it has allocated new resources to the command stream.

In this case, a command stream could simply be paused until it can be allocated the appropriate resources, or, alternatively, the command stream could be suspended and another command stream activated and executed in the meantime, before resuming the initial command stream at a later time.

In one such arrangement, the command stream instructions that can be intercepted in the manner of the technology described herein comprise at least "run" commands (instructions) that are operable to trigger a processing task or tasks on the data processor. In this case, the run commands will require appropriate processing resources (hardware units) of the data processor, and so it may be desirable to intercept such commands in the event that the required resources are not currently available or allocated to the command stream in question.

In an embodiment, the data processor is a graphics processor, and the command stream instructions that can be intercepted in the manner of the technology described herein comprise "run" commands that are operable to trigger a processing task or tasks on the graphics processor. Correspondingly, in one such embodiment, the run commands are intercepted based on the availability of appropriate hardware units of the graphics processor, and in an embodiment based on the availability of hardware units comprising one or more or all of: command iterators that are operable to take a processing job triggered by a run command and split it up into a number of processing tasks that can then be issued, for example, to further hardware units, e.g. in the form of processing (shader) cores; and one or more processing (shader) cores. In this case, the hardware units, such as the iterators, may be bound to particular command streams, such that they are not available for use for other command streams, and so in that case it would be desirable to intercept, e.g., and in an embodiment, "run" instructions in command streams that do not currently have the appropriate iterator and/or processing core or cores assigned to them.

Other arrangements would, of course, be possible.

In an embodiment, the operation in the manner of the technology described herein is used to intercept instructions (commands) in a program (e.g. command stream) that is being executed to provide performance and/or state information, such as information on the current state and/or resource usage, etc., of the data processor, when executing a program (e.g. command stream).

In this case, instructions in a program (e.g. in a command stream, such as "run" instructions) could be flagged to be intercepted, with the operation then proceeding when such an instruction is intercepted to cause a controller processing unit to output (and/or to trigger the output of) appropriate performance information and/or (internal) state information of the data processor, before then resuming normal execution of the instruction in the program (e.g. command stream).

This would then facilitate providing such performance related information, (internal) state, etc., for debugging purposes, etc., without the need to modify the actual program (e.g. command stream) itself. For example, there would be no need to include in the program (e.g. command stream) any specific instructions to trigger the generation and outputting of the performance and/or state information, rather the program (e.g. command stream) in its normal form could simply be provided to the data processor for execution. This would then avoid, for example, any need to modify the driver operation when generating the program (e.g. command streams) in order to be able to provide performance and/or state related information, such as debugging information.

Other arrangements would, of course, be possible.

The data, e.g. graphics, processor of the technology described herein will be and is in an embodiment part of an overall data, e.g. graphics, processing system that will include, e.g., and in an embodiment, a host processor that, e.g., executes applications that require processing by the data processor. The host processor will send appropriate commands and data to the data processor to control it to perform data processing operations and to produce data processing output required by applications executing on the host processor. To facilitate this, the host processor should, and in an embodiment does, also execute a driver for the data processor, e.g. and a compiler or compilers for compiling programs to be executed by the programmable stage(s) executed by the data processor. The compiler may, e.g., be part of the driver operation.

The data, e.g. graphics, processor and/or data processing system, may also comprise, and/or be in communication with, one or more memories and/or memory devices that store the data described herein, and/or the output data generated by the data processor, and/or store software for performing the processes described herein. The data processor may also be in communication with a host microprocessor, and/or with a display for displaying images based on the data generated by the data processor.

Where the data processor is a graphics processor, then as well as any programmable processing (shader) stages, the graphics processor may also implement any other suitable and desired processing stages that a graphics processing pipeline may contain such as a rasteriser, an early depth (or an early depth and stencil) tester, a late depth (or depth and stencil) tester, a blender, a tile buffer, a write out unit, etc.

The technology described herein can be used for all forms of output that a data processor may be used to generate, such as in the case of a graphics processor, frames for display, render-to-texture outputs, etc. The output data from the data processing is in an embodiment exported to external, e.g. main, memory, for storage and use.

The technology described herein can be implemented in any suitable system, such as a suitably configured microprocessor based system. In an embodiment, the technology described herein is implemented in a computer and/or microprocessor based system.

The various functions of the technology described herein can be carried out in any desired and suitable manner. For example, the functions of the technology described herein can be implemented in hardware or software, as desired. Thus, for example, unless otherwise indicated, the various functional elements of the technology described herein may comprise a suitable processor or processors, controller or controllers, functional units, circuitry, circuits, processing logic, microprocessor arrangements, etc., that are operable to perform the various functions, etc., such as appropriately dedicated hardware elements (circuits/circuitry) and/or programmable hardware elements (circuits/circuitry) that can be programmed to operate in the desired manner.

It should also be noted here that, as will be appreciated by those skilled in the art, the various functions, etc., of the technology described herein may be duplicated and/or carried out in parallel on a given processor. Equally, the various processing stages may share processing circuitry, etc., if desired.

It will also be appreciated by those skilled in the art that all of the described embodiments of the technology described herein can, and in an embodiment do, include, as appropriate, any one or more or all of the features described herein.

The methods in accordance with the technology described herein may be implemented at least partially using software e.g. computer programs. It will thus be seen that when viewed from further embodiments the technology described herein comprises computer software specifically adapted to carry out the methods herein described when installed on a data processor, a computer program comprising computer software code for performing the methods herein described when the program is run on a data processor, and a computer program comprising code adapted to perform all the steps of a method or of the methods herein described when the program is run on a data processing system. The data processor may be a microprocessor system, a programmable FPGA (field programmable gate array), etc.

The technology described herein also extends to a computer software carrier comprising such software which when used to operate a graphics processor, renderer or microprocessor system comprising a data processor causes in conjunction with said data processor said processor, renderer or system to carry out the steps of the methods of the technology described herein. Such a computer software carrier could be a physical storage medium such as a ROM chip, CD ROM, RAM, flash memory, or disk, or could be a signal such as an electronic signal over wires, an optical signal or a radio signal such as to a satellite or the like.

It will further be appreciated that not all steps of the methods of the technology described herein need be carried out by computer software and thus from a further embodiment the technology described herein comprises computer software and such software installed on a computer software carrier for carrying out at least one of the steps of the methods set out herein.

The technology described herein may accordingly suitably be embodied as a computer program product for use with a computer system. Such an implementation may comprise a series of computer readable instructions either fixed on a tangible, non-transitory medium, such as a computer readable medium, for example, diskette, CD-ROM, ROM, RAM, flash memory, or hard disk. It could also comprise a series of computer readable instructions transmittable to a computer system, via a modem or other interface device, either over a tangible medium, including but not limited to optical or analogue communications lines, or intangibly using wireless techniques, including but not limited to microwave, infrared or other transmission techniques. The series of computer readable instructions embodies all or part of the functionality previously described herein.

Those skilled in the art will appreciate that such computer readable instructions can be written in a number of programming languages for use with many computer architectures or operating systems. Further, such instructions may be stored using any memory technology, present or future, including but not limited to, semiconductor, magnetic, or optical, or transmitted using any communications technology, present or future, including but not limited to optical, infrared, or microwave. It is contemplated that such a computer program product may be distributed as a removable medium with accompanying printed or electronic documentation, for example, shrink-wrapped software, preloaded with a computer system, for example, on a system ROM or fixed disk, or distributed from a server or electronic bulletin board over a network, for example, the Internet or World Wide Web.

An embodiment of the technology described herein will now be described in the context of a graphics processing unit whose operation is controlled and triggered through the use of command streams. However, it will be appreciated that the technology described herein may generally find utility in any data processing system that includes programmable processors that execute program instructions to perform processing operations.

Thus, for the graphics processor of the present embodiment, the submission of processing work to the graphics processor is controlled using command streams (which are essentially machine code programs that can be executed by a special processor). The graphics processor is thus provided with a command stream frontend including a dedicated processing unit, a 'command stream execution unit', for interpreting and implementing the command streams.

Processing work for the graphics processor is thus specified by the host processor generating a suitable sequence of commands for implementation by the graphics processor. The host processor accordingly comprises suitable command stream generating circuitry (in the form of a driver) operable to prepare, in response to a request for processing to be performed by the graphics processor from an application being executed by the host processor, one or more command stream(s) to cause the graphics processor to perform processing tasks for the application, each command stream including a sequence of commands for implementation by the graphics processor. The command stream generating circuitry acts to translate calls for processing from (applications running on) the host processor into a sequence of commands (instructions) for implementation by the graphics processor.

In the present embodiment, the sequence of commands making up a command stream is stored in an appropriate buffer or buffers. Where plural buffers are used for a command stream, they are all in an embodiment considered to be part of the same command stream (and share the same register file and other state).

The command stream buffers are stored in main (system) memory, but commands therefrom (their contents) can be prefetched/cached (e.g. in local storage of the graphics processor) when the command stream is being/is to be executed, to aid execution throughput.

In order to execute the command streams, the graphics processor is provided with suitable command stream execution circuitry (generally referred to herein as a 'command stream frontend'). The command stream frontend (circuitry) may generally comprise one or more command stream interface(s) and a command stream execution unit.

The (and each) command stream interface is operable to cause the graphics processor to execute a respective command stream that has been assigned to that command stream interface. Thus, a (and each) command stream interface can have associated with it (assigned to it) a command stream buffer storing a sequence of commands (a command stream) to be implemented.

When a command stream is to be prepared and executed, a respective command stream interface is in an embodiment allocated (assigned to) that command stream.

Each command stream interface in an embodiment also comprises (has associated with it) a local memory and registry to which state values (parameters) for the processing jobs can be stored. Thus, parameters for processing jobs can be set and stored locally for each command stream interface (e.g. without having to include the state parameters explicitly in the job descriptors provided by the host processor).

The command stream frontend (circuitry) also includes a command stream execution unit for implementing the commands. The command stream execution unit is thus operable to fetch commands from the one or more command buffers (that are currently assigned to a command stream interface) and to then interpret and execute those commands.

In general, any number of command stream interfaces may be provided, as desired. For instance, in some embodiments, a plurality of (e.g. two) command stream interfaces are provided. In such cases, where a plurality of command stream interfaces are provided, the command stream execution unit may, for example, process commands for the respective command stream interfaces in an alternating (e.g. round robin) fashion.

The graphics processor also includes an appropriate supervising controller, in the form of a microcontroller, that is operable to handle the scheduling of the command streams on the hardware execution resources of the graphics processor. The supervising microcontroller controls the operation of the command stream frontend, including assigning command streams to respective command stream interfaces, etc.

Some commands in a command stream will be implemented natively in hardware in the graphics processor. Others may be emulated in software by the controller. Thus, when a command in a command stream is executed, e.g. by the command stream execution unit, the instruction (or processing work) associated with that command may be implemented either in hardware or emulated by the controller. This will typically depend on the type of the command that is being executed.

For example, a command stream may contain a series of 'MOVE' commands for loading parameter values into the local memory or registry associated with that command buffer to initialise or modify the state vector. These commands can be executed in turn by the command stream execution unit in order to set the parameters for the processing job. These types of command are in an embodiment implemented natively, e.g. using appropriate command stream execution unit hardware.

The command stream execution unit is also operable to schedule processing work to be performed by the graphics processor hardware units. For example, a 'RUN' command may be executed wherein processing work is sent to the graphics processor hardware for processing. A RUN command is effectively a processing job but with the initial state (parameters) (in an embodiment) being obtained from the local memory or registry (e.g. rather than being explicitly incorporated as a job descriptor). These commands are thus implemented (natively) in the graphics processor hardware.

The hardware units of the graphics processor (and that are associated with the execution unit) in this regard may typically comprise one or more iterator(s) and one or more (in an embodiment a plurality of) processing core(s). Thus, when processing work is sent to the graphics processor hardware units, e.g. when executing a RUN command, the processing job may be sent, along with the initial state (parameters), to a respective iterator. An iterator takes the processing job and splits it up into a number of processing tasks which can then be issued to the processing core(s). The iterator can also track the completion of the processing tasks.

The iterators may be bound to a particular command stream interface. That is, each command stream interface may be associated with, and only able to submit processing jobs to, a particular set of one or more iterators. These bindings can be defined and controlled (dynamically) by the controller.

Other types of commands e.g. that are less frequent, of a more complex nature, that can be expected to have some delay, and/or that may need to wait on an external entity, may be emulated in software by the controller.

In general, any desired number of commands streams can be prepared for the graphics processor. Each command stream may relate to any suitable and desired processing work. Where multiple command streams are prepared, each command stream may relate to a different or the same type of processing task.

Figure 2:
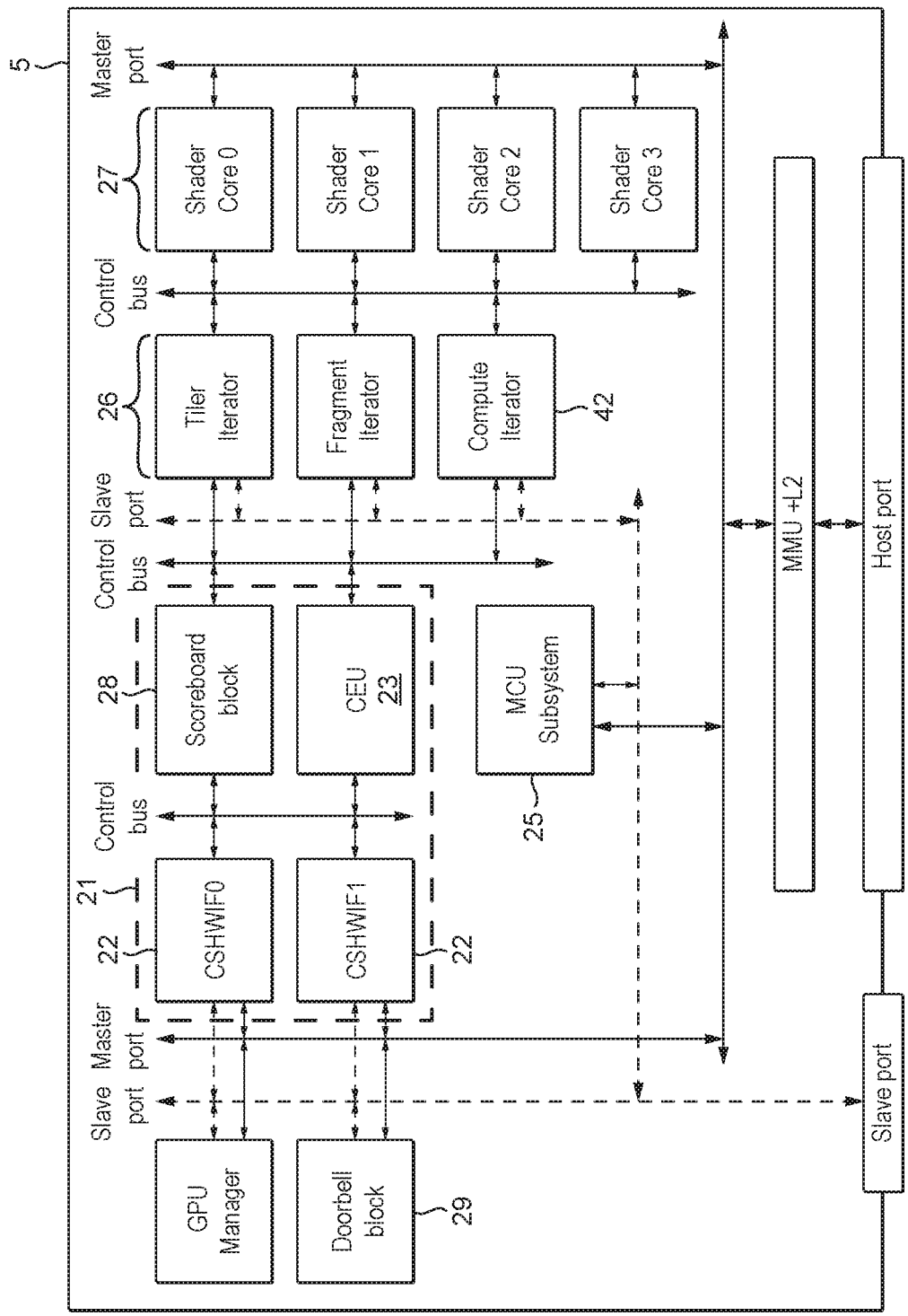
FIG. 2 shows schematically in more detail a graphics processor (including a command stream frontend) that can be operated in the manner of the technology described herein.
Figure 3:
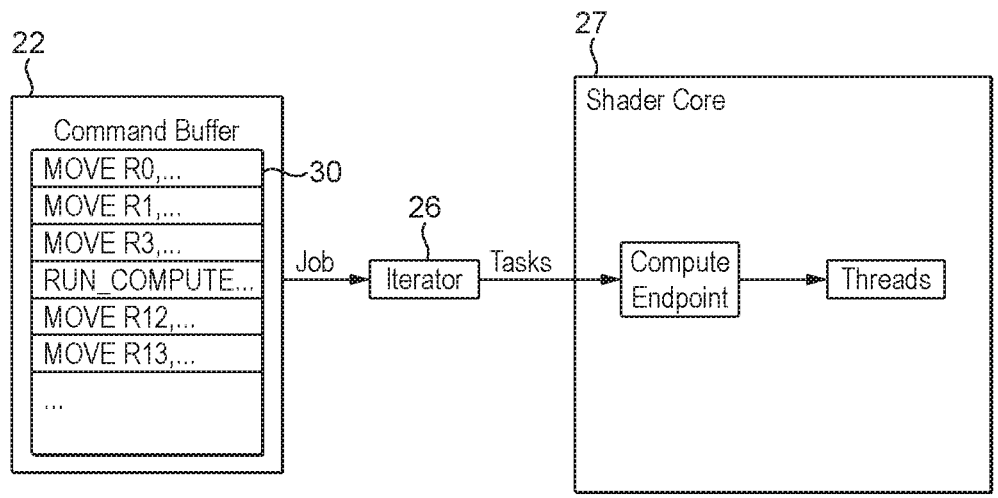
FIG. 3 shows schematically how a command stream may be executed using a graphics processor like that shown in FIG. 2.

FIGS. 1 to 3 show this arrangement and operation of the graphics processor in the present embodiments in more detail.

FIG. 1 shows an exemplary data processing system 1 that may, for instance, comprise an embedded data processing system for use, for example, in a portable electronic device, such as a mobile phone or tablet. The data processing system includes a host processor (CPU) 2 on which an operating system (OS) 3, and one or more applications 4 may execute, and a memory 7.

The data processing system also includes an associated graphics processing unit (GPU) 5 that can perform graphics processing operations for the applications 4 and the operating system 3 executing on the host processor 2. To facilitate this, the host processor 2 also executes a driver 6 for the GPU 5. For instance, an application 4 such as a game executing on the host processor 2 may various require graphics processing operations to be performed by the GPU 5. To do this, the application will generate API (Application Programming Interface) calls that are interpreted by the driver 6 to generate appropriate commands for the GPU 5 to generate the graphics output required by the application 4.

Particularly, the driver 6 is operable to generate a set of "commands" to be provided to the GPU 5 in response to requests from the application 4 running on the host processor 2 for graphics output (e.g. to generate a frame to be displayed). In the present embodiments, the appropriate commands and data for performing the processing tasks required by the application 4 are provided to the GPU 5 in the form of one or more command stream(s), that each include a sequence of commands (instructions) for causing the graphics processor to perform desired processing tasks.

The command streams are prepared by the driver 6 on the host processor 2 and may, for example, be stored in appropriate command stream buffers 8 in the memory 7, from where they can then be read into the GPU 5 for execution. Each command stream may contain commands (instructions) to set parameters for graphics processor tasks, as well as commands (instructions) to execute a task, etc.

The GPU 5 thus includes a command stream frontend for receiving and interpreting these command streams and to control job submission for the GPU 5.

FIG. 2 shows in more detail the GPU 5 including the command stream frontend 21. The command stream frontend 21 is generally operated under the control of a supervising microprocessor (MCU) 25, which handles communications with the host processor 2, and schedules the processing of active command streams on the command stream frontend 21.

The command stream frontend 21, which may be implemented as a single (hardware) functional unit, generally comprises one or more command stream interfaces 22 and a (shared) command stream execution unit 23. Each command stream interface 22 has an associated command buffer containing a set of active instructions to be processed, as well as a registry and local memory for storing the internal state (parameters) for the processing. The command buffer is contained in system memory with the command stream interface containing its properties so it can obtain commands from it.

The instructions within the command buffer(s) are provided to the command stream execution unit 23 and then executed in turn (e.g. in a round robin fashion where multiple command stream interfaces 22 are provided). The command stream execution unit 23 thus executes the commands in turn, with the instructions either being emulated in software by the MCU 25, or assigned to the accelerator hardware, e.g. depending on the type of instruction.

(In general when the command stream execution unit 23 executes an instruction, it will either perform the operation synchronously itself (e.g. a move operation), or it will "package up" a request and send it to the GPU hardware units in the case of (e.g. a run command), or it will inform the supervising MCU 25, which may then emulate the command in software.)

The command stream frontend 21 also includes a scoreboard block 28 that is able to independently track the processing job completion for each of the command steam interfaces 22. The scoreboard block 28 is thus a shared resource. The scoreboard block 28 tracks the progress of the processing tasks associated with each processing job and reports this back.

As shown in FIG. 2, the GPU 5 includes a number of hardware units, such as a plurality of iterators 26 (here, separate tiler, fragment and compute iterators are provided, although other arrangements would of course be possible) and processing (e.g. shader) cores 27.

A processing job specified in a command being executed by the command stream execution unit 23 can thus be assigned and sent to a respective iterator 26, along with the current parameters held within the registry and local memory. The iterator 26 acts to break down the processing job into a set of processing tasks which can then be distributed between the processing cores 27 for processing.

The host processor 2 communicates with the MCU 25 of the GPU 5 via a shared interface memory (which may be main memory, or another suitable memory cache, depending on the configuration). Thus, when an application 4 running on the host processor 2 makes a call for processing by the GPU 5, the host processor 2 can communicate with the MCU 25 of the GPU 5 via the shared memory, and the MCU can then read the data in from the shared memory. For instance, the host processor 2 can write to a doorbell block 29 to interrupt the current operation of the MCU 25 and cause the MCU 25 to handle new work.

Once the MCU 25 receives a request from the host processor 2 to execute a command stream, the MCU 25 can then assign a respective command stream interface 22 for the command stream, and the command stream can then be loaded into a command buffer for the assigned interface (and the command stream properties written to the assigned interface). The commands are then passed in order from the command buffer to the command stream execution unit 23 which interprets the commands from the command buffers, and executes the commands using the local memory and registry information associated with that command stream interface and buffer.

When a command is executed by the command stream execution unit 23, depending on the type of instruction, the instruction may then be performed either in hardware (e.g. by the command stream execution unit 23 itself, or using the iterators 26 and shader cores 27), or may be emulated by the MCU 25. For instance, any commands e.g. for updating the local memory and registry information may typically be implemented by the command stream execution unit 23 itself in order to set the parameters for a processing job. The processing job may then be sent to the GPU hardware unit(s) for processing, along with these parameters.

FIG. 3 illustrates the execution of a command stream within a system like that shown in FIG. 2. The command stream in the command buffer 30 includes a sequence of instructions of different types, including e.g. 'MOVE' and 'RUN' commands. The MOVE commands, for example, load constants into the local memory or registry on the command stream interfaces in order to initialise or modify the state vectors for a processing job. The 'RUN' command then sends the state vector to an iterator 26 to start the processing job iteration. Various other types of commands may also be used, for instance, a 'LOAD' command may be implemented to bulk read from/write to system memory. A 'WAIT' command may also be implemented to cause the processing to wait for the completion of any asynchronous (e.g. RUN or LOAD) commands.

MOVE commands will be implemented within the command stream execution unit 23. LOAD and WAIT commands (and also "synchronisation" commands) will typically be emulated in firmware by the MCU 25.

The RUN commands are implemented in the hardware units of the GPU. Thus, as shown in FIG. 3, when a RUN command is executed, a processing job is then sent to the respective iterator 26 (along with the state vector whose value has been initialised in the previous commands). The iterator 26 then breaks the processing job into smaller processing tasks which are then issued to the shader core(s) 27. Each shader core may comprise an endpoint that is able to take a task and issue it to thread groups within the shader core. The iterators 26 may be bound to a particular command stream interface 22 before starting an asynchronous command.

The present embodiments relate in particular to the operation of the graphics processing unit 5 shown in FIGS. 1 and 2 when executing a command stream such as that illustrated in FIG. 3, and in particular to the dynamic interception of instructions in a command stream that is being executed, so as to permit, for example, special handling of particular instructions in a command stream as the command stream is being executed.

Such dynamic interception of instructions in a command stream that is being executed may be particularly useful in the present embodiments in the case where appropriate hardware units (hardware resources) of the graphics processor are not currently available to the command stream in question.

For example, as illustrated in FIG. 2, the graphics processing unit 5 includes a number of hardware units, such as the iterators 26 and the shader cores 27, that are available for execution of command streams. In operation of the GPU 5, respective ones of those hardware units may be allocated to respective command stream interfaces 22 (e.g. under the control of the MCU 25). For example, a first command stream interface that has a command stream that is to perform a compute job may be assigned access to the compute iterator 42, such that if the command stream for a second command stream interface is also performing a compute job, the compute iterator 42 may not be available for that second command stream interface.

Figure 4:
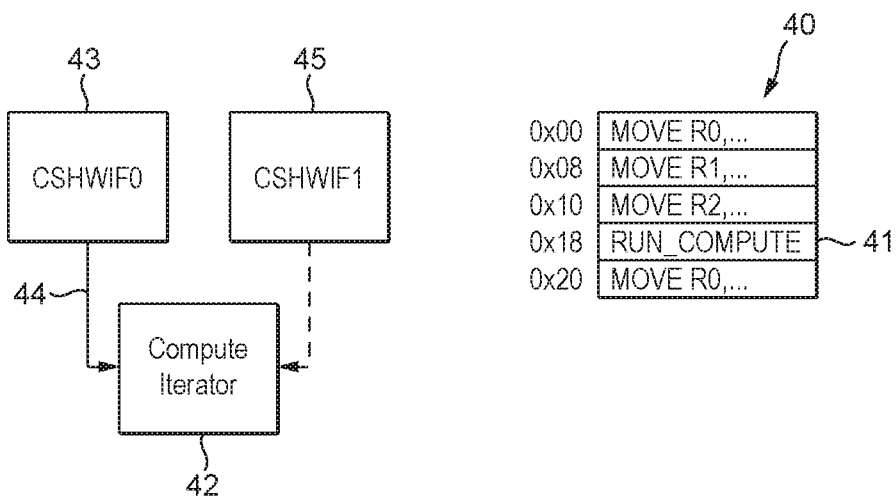
FIG. 4 shows an exemplary command stream that can be handled in the manner of the technology described herein.

FIG. 4 illustrates this, and shows a respective command stream 40 that includes a command 41 to perform a compute processing task (and thus in response to which run command the processing task will be sent to the compute iterator 42 for provision to one or more of the shader cores 27 for processing).

FIG. 4 correspondingly shows that if a first command stream interface 43 has been allocated 44 the compute iterator 42 as a resource, then the compute iterator 42 will not be available 46 to a second command stream interface 45 that may also be executing a command stream that includes a run_compute command.

In this case, when the second command stream interface 45 encounters the run_compute command 41 in its command stream, it cannot execute that run_compute command as the compute iterator is not available to it for that purpose. In that case, it would be desirable to be able to handle the run_compute command for the second command stream interface 45 in some manner.

Moreover, the Applicants have recognised that because the availability of resources to the command stream interfaces (for example) will change dynamically in use and during command stream execution (e.g. depending upon the resources required for the command streams that are currently being executed), then the availability of the required hardware resource for a command stream and a command stream interface may vary over time. As such, it would be desirable to be able to dynamically change the way that commands in command streams are handled in use, and, for example, during execution of command streams.

To facilitate this, in the present embodiments, and in accordance with the technology described herein, instructions (commands) in a command stream can be indicated as to be intercepted during their execution (such that they can then be handled in a different manner).

In particular, a table of intercept indications is maintained for respective instruction (command) types, which indications can then dynamically be set to indicate whether instructions of that particular type should be intercepted during their execution or not. The respective intercept indications are stored in association with the opcodes for the commands (instructions) that it is desired to be able to intercept in an intercept ("trap") enable register 53, such that the opcode for an instruction can be used to look up the corresponding intercept indication for that instruction to determine how the instruction is to be handled.

Then, during decoding of an instruction, the intercept indication table is checked to see if the instruction has an associated intercept indication (and whether, if so, that indication is set to indicate that the instruction should be intercepted during its execution or not), with the instruction then being handled accordingly.

Figure 5:
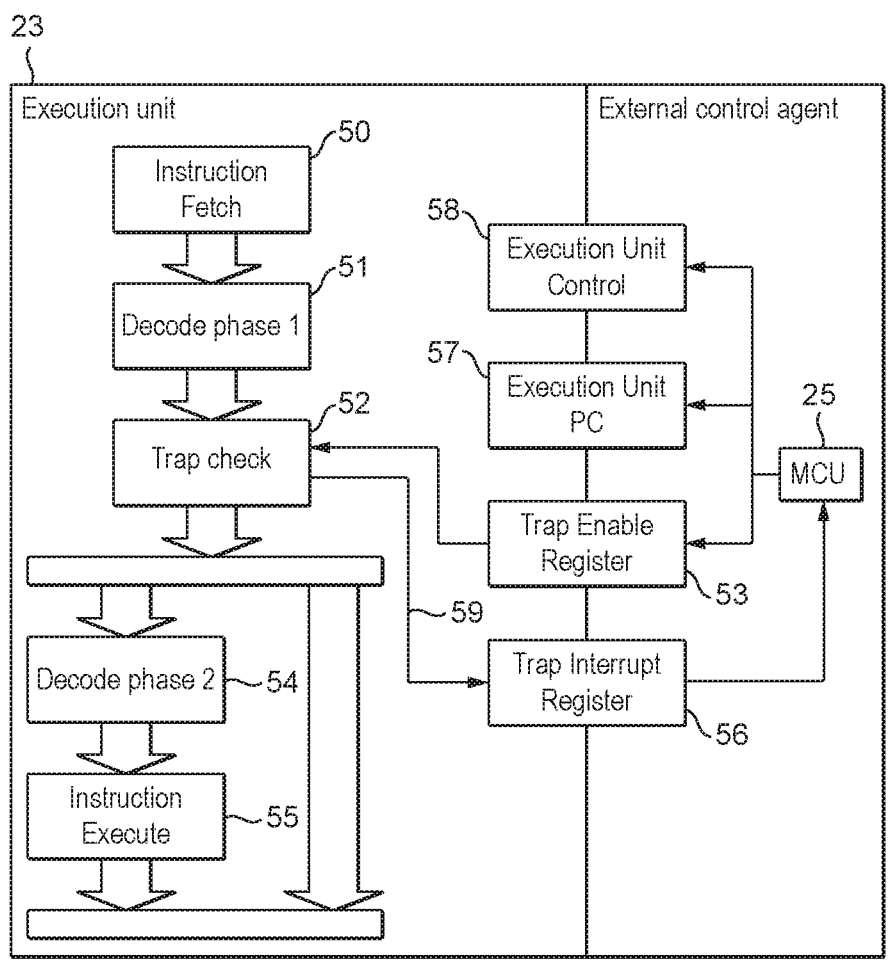
FIG. 5 shows schematically the operation of the execution unit of a data processor in an embodiment of the technology described herein.

FIG. 5 illustrates this operation and shows the relevant steps and elements of the command stream execution unit 23 during execution of an instruction (command) in a command stream that is being executed.

As shown in FIG. 5, when executing a command stream, the execution unit 23 will, inter alia, first fetch 50 the next command (instruction) for the command stream to be executed, using appropriate instruction fetch circuitry. The instruction may, e.g., be cached in an instruction cache.

The execution unit 23 will then decode 51, using instruction decode circuitry, a first part, and in the present embodiments only the opcode for the instruction.

The decoded opcode for the instruction is then used 52 to determine whether the instruction is indicated as to be intercepted (trapped) during its execution or not. To do this, the execution unit uses the decoded opcode for the instruction as an index into a table of instruction opcodes with associated intercept instructions that is stored in an appropriate "trap enable" register 53 associated with the execution unit 23.

In the present embodiments, as shown in FIG. 5, the instructions that are to be intercepted and their respective indications of whether they should be intercepted (trapped) or not, is set by the microcontroller 25 that is controlling the operation of the command stream frontend 21. Thus the microcontroller 25 sets indications in the trap enable register 53 to cause instructions (commands) in command streams to be intercepted based, e.g., and as discussed above, on the availability of resources to respective command streams and command stream interfaces.

In the present embodiment, the microcontroller 25 maintains in the array of trap enable registers 53 a single bit for each possible instruction opcode, which "intercept" (trap) bit can be set to trigger the interception of instructions of that type. The microcontroller is able to set the intercept bit for an instruction type (opcode) and correspondingly to disable the interception of an instruction type (by clearing the bit for the corresponding opcode) at any point during program (command stream) execution.

Other arrangements for setting instructions as to be intercepted (trapped) or not could also or instead be used if desired. For example, the driver for the graphics processor could also be configured to set certain instructions or instruction types to be trapped (intercepted), if desired.

If the instruction "trap" check 52 determines that the instruction is not indicated as to be intercepted (trapped) during its execution, then the execution unit proceeds with decoding 54 the remainder of the instruction (e.g. the operands for the instruction) and then 55 executes or issues the instruction for execution.

The next instruction will then be processed in the same manner, and so on.

On the other hand, if the instruction is determined as indicated to be intercepted (trapped) during its execution, then the instruction execution is paused and the "intercept" (trap) state is signalled 59 to the MCU 25 through, in the present embodiments, a trap (intercept) interrupt register 56.

In response to this intercept (trap) signal (interrupt), the microcontroller 25 then operates to take the appropriate action in response to the interception of the instruction (i.e. takes the required action for which the instruction interception (trap) was set).

This action could be, for example, and in an embodiment, to change the operating mode of the execution unit or to make some other change that affects the execution unit's execution flow.

In the present embodiment, the controller 25 pauses the execution of the command stream by the execution unit 23, and/or suspends execution of the command stream by the execution unit (and, e.g., saves the current execution state so that execution of the current stream can be resumed at a later time).

The controller 25 then, in this case, remaps graphics processor hardware resources such as an iterator and/or processing core or cores to the command stream interface for the command stream in question (as that is the required action for which the instruction was indicated to not be sent for execution by a hardware unit of the graphics processor), so that the intercepted command can now be executed.

If the required graphics processor hardware resources are currently available, then the controller 25 can immediately remap those graphics processor hardware resources to the command stream interface for the command stream in question and resume execution of the command stream.

On the other hand, if the required graphics processor hardware resources are not currently available to allocate to the command stream interface for the command stream in question, then the command stream in question can be suspended, and the command stream hardware interface reassigned to a different command stream, with the suspended command stream then being resumed when the required graphics processor hardware resources become available (for example).

Once the desired action for which the instruction intercept indication was set has been performed, then the controller 25 operates to cause the execution unit 23 to continue its execution of the command stream. This could include, for example, clearing the interrupt; restoring the previous operating mode; resuming execution of the command stream; and/or restoring the execution unit back to its normal operating state, etc.

Once the execution unit has been returned to its normal operating state, execution of the next command (instruction) can be performed in a similar manner, and so on.

Figure 6:
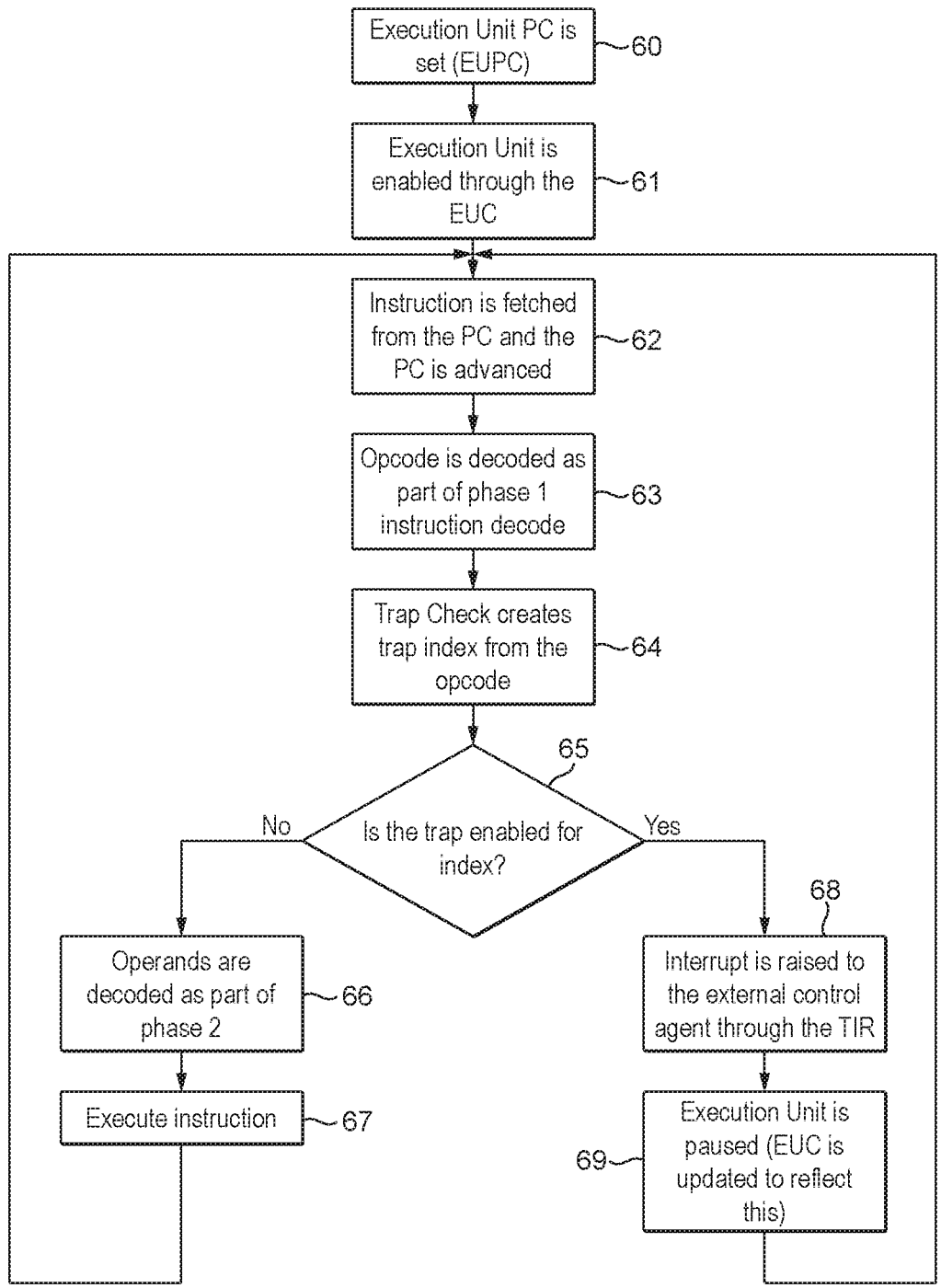
FIG. 6 is a flowchart illustrating the operation of the execution unit of a data processor in an embodiment of the technology described herein.

FIG. 6 is a corresponding flowchart illustrating the operation shown in FIG. 5.

Thus, as shown in FIG. 6, the process starts with the microcontroller 25 setting the execution unit program counter 57 to indicate the next instruction to be executed (step 60). The execution unit 23 is then enabled via an execution unit control circuit 58 (step 61).

The execution unit then fetches the instruction to be executed according to the execution unit program count (and the program count is advanced) (step 62).

The execution unit then decodes the opcode for the instruction (step 63) and uses the opcode to create an index into the instruction "trap" table and then uses that index to determine whether the instruction in question should be intercepted (trapped) or not (steps 64 and 65).

If the instruction is not to be intercepted (trapped), then the remaining instruction decoding to decode the operands is performed (step 66) and the instruction is executed in the normal manner (step 67).

On the other hand, if the instruction is determined at step 65 as to be intercepted (trapped), then the execution unit signals that to the microcontroller 25 via an interrupt through the trap interrupt register 56 (step 68) and the execution unit operation is paused (step 69) while the microcontroller 25 performs the appropriate actions in response to the intercepted (trapped) instruction.

It can be seen from the above that the technology described herein, in its embodiments at least, provides a mechanism for dynamically intercepting and performing special handling of instructions in programs being executed. This is achieved, in the embodiments of the technology described herein at least, by associating instructions with indications that instructions should be intercepted, and then checking those indications during the instruction decoding phase of the instruction execution operation.

The foregoing detailed description has been presented for the purposes of illustration and description. It is not intended to be exhaustive or to limit the technology described herein to the precise form disclosed. Many modifications and variations are possible in the light of the above teaching. The described embodiments were chosen in order to best explain the principles of the technology described herein and its practical applications, to thereby enable others skilled in the art to best utilise the technology described herein, in various embodiments and with various modifications as are suited to the particular use contemplated. It is intended that the scope be defined by the claims appended hereto.

The invention claimed is:

1. A method of operating a data processor when executing a program comprising a sequence of instructions, the data processor comprising an execution unit for executing instructions in a program to be executed by the data processor, the execution unit being associated with one or more hardware units operable to execute instructions, and being operable to fetch and decode instructions for execution by the hardware unit or units, the method comprising:
for a program comprising a sequence of instructions to be executed by the execution unit of the data processor:
associating with at least one instruction in the program that may be executed on a hardware unit, an indication of whether the instruction should be issued directly for execution by a hardware unit or should be intercepted during its execution by the execution unit;
and
the execution unit:
when decoding the instruction for execution by a hardware unit in the program, determining from the indication associated with the instruction whether the instruction should be issued directly for execution by a hardware unit or intercepted during its execution by the execution unit;
and
in response to the determination, either:
issuing the instruction for execution by a hardware unit directly; or
pausing execution of the instruction and performing another operation;
wherein:
the program that is being executed by the execution unit comprises a command stream for controlling operation of the data processor, and the execution unit comprises a command stream execution unit of the data processor; and
a controller processing unit of the data processor is operable to allocate respective hardware units of the data processor to command streams to be executed; and
the method further comprises:
the controller processing unit:
determining whether a command stream to be executed has been allocated the required hardware units to execute its instructions; and
when a command stream has not been allocated the hardware units to execute instructions of a particular type, setting an indication to indicate whether an instruction should be issued directly for execution by a hardware unit or should be intercepted during its execution by the execution unit for instructions of that particular type, to indicate that instructions of that particular type should be intercepted during their execution by the execution unit for the command stream;
and
in response to the interception of an instruction of the particular type in the command stream:
stopping execution of the command stream at the intercepted instruction and re-allocating hardware units of the data processor to the command stream; and
then causing the execution unit to resume execution of the command stream at the intercepted instruction after new hardware units have been allocated to the command stream.

2. The method of claim 1, wherein one or more types of instruction that can be executed by the execution unit each have a corresponding associated indication that can be set to indicate of whether instructions of that type should be issued directly for execution by a hardware unit or should be intercepted during their execution by the execution unit.

3. The method of claim 1, comprising:
using an identifier determined for the instruction when decoding the instruction to determine whether the instruction has an associated indication to indicate whether the instruction should be issued directly for execution by a hardware unit or should be intercepted during its execution by the execution unit;
and
when it is determined that the instruction has an associated indication to indicate whether the instruction should be issued directly for execution by a hardware unit or should be intercepted during its execution by the execution unit, determining from the indication associated with the instruction whether to issue the instruction directly for execution by a hardware unit or to intercept the execution of the instruction by the execution unit.

4. The method of claim 1, comprising the data processor setting the indication to indicate whether the instruction should be issued directly for execution by a hardware unit or should be intercepted during its execution by the execution unit for an instruction in the program, to indicate that the instruction should be intercepted during its execution by the execution unit.

5. The method of claim 4, wherein the data processor determines whether to set the indication to indicate whether the instruction should be issued directly for execution by a hardware unit or should be intercepted during its execution by the execution unit for an instruction in the program to indicate that the instruction should be intercepted during its execution by the execution unit, based on current operating conditions of the data processor.

6. The method of claim 1, wherein the another operation that the execution unit performs when the indication indicates that the instruction should be intercepted during its execution by the execution unit comprises signalling to a controller processing unit that an instruction that has been indicated to be intercepted has been encountered.

7. The method of claim 6, wherein the controller processing unit that is signalled is an internal controller processing unit of the data processor.

8. The method of claim 6 comprising the controller processing unit in response to the signal from the execution unit, performing an operation, or triggering another processing unit to perform an operation, the operation comprising:
changing the allocation of data processor hardware units to a program or programs being executed by the execution unit; and/or
obtaining and/or providing performance and/or state information relating to the operation of the execution unit when executing the program.

9. The method of claim 1, wherein the data processor is a graphics processor.

10. A data processor, the data processor comprising:
an execution unit for executing instructions in a program to be executed by the data processor;
one or more hardware units associated with the execution unit and operable to execute instructions under the control of the execution unit;
the execution unit further comprising:
instruction fetch circuitry operable to fetch instructions for execution by the hardware unit or units; and
instruction decode circuitry operable to decode instructions for execution by the hardware unit or units;
and wherein the instruction decode circuitry of the execution unit is configured to:
when decoding an instruction for execution by a hardware unit associated with the execution unit:
determine whether the instruction has associated with it an indication of whether the instruction should be issued directly for execution by a hardware unit or should be intercepted during its execution by the execution unit;
and to, when it is determined that the instruction has associated with it an indication of whether the instruction should be issued directly for execution by a hardware unit or should be intercepted during its execution by the execution unit;
determine from the indication whether the instruction should be issued directly for execution by a hardware unit or intercepted during its execution by the execution unit; and to
in response to that determination, either:
issue the instruction for execution by a hardware unit directly; or
pause execution of the instruction and perform another operation;
wherein:
the program that is being executed by the execution unit comprises a command stream for controlling operation of the data processor, and the execution unit comprises a command stream execution unit of the data processor; and
the data processor comprises:
a controller processing unit operable to allocate respective hardware units of the data processor to command streams to be executed;
the controller processing unit being configured to:
determine whether a command stream to be executed has been allocated the required hardware units to execute its instructions; and
when a command stream has not been allocated the hardware units to execute instructions of a particular type, set an indication to indicate whether an instruction should be issued directly for execution by a hardware unit or should be intercepted during its execution by the execution unit for instructions of that particular type, to indicate that instructions of that particular type should be intercepted during their execution by the execution unit for the command stream;
and to
in response to the interception of an instruction of the particular type in the command stream;
stop execution of the command stream at the intercepted instruction and re-allocate hardware units of the data processor to the command stream; and then cause the execution unit to resume execution of the command stream at the intercepted instruction after new hardware units have been allocated to the command stream.

11. The data processor of claim 10, wherein one or more types of instruction that can be executed by the execution unit each have a corresponding associated indication that can be set to indicate of whether instructions of that type should be issued directly for execution by a hardware unit or should be intercepted during their execution by the execution unit.

12. The data processor of claim 10, wherein the instruction decode circuitry of the execution unit is configured to:
use an identifier determined for an instruction when decoding the instruction to determine whether the instruction has an associated indication to indicate whether the instruction should be issued directly for execution by a hardware unit or should be intercepted during its execution by the execution unit;
and
when it is determined that the instruction has an associated indication to indicate whether the instruction should be issued directly for execution by a hardware unit or should be intercepted during its execution by the execution unit, determine from the indication associated with the instruction whether to issue the instruction directly for execution by a hardware unit or to intercept the execution of the instruction by the execution unit.

13. The data processor of claim 10, wherein the data processor further comprises processing circuitry operable to set an indication to indicate whether an instruction should be issued directly for execution by a hardware unit or should be intercepted during its execution by the execution unit for an instruction in a program, to indicate that the instruction should be intercepted during its execution by the execution unit.

14. The data processor of claim 13, wherein the processing circuitry of the data processor is configured to determine whether to set the indication to indicate whether the instruction should be issued directly for execution by a hardware unit or should be intercepted during its execution by the execution unit for an instruction in the program to indicate that the instruction should be intercepted during its execution by the execution unit, based on current operating conditions of the data processor.

15. The data processor of claim 10, wherein the data processor comprises a controller processing unit operable to control the operation of the execution unit, and the another operation that is performed when an instruction should be intercepted during its execution by the execution unit comprises signalling to the controller processing unit that the instruction has been indicated to be other than sent directly for execution on a hardware unit.

16. The data processor of claim 15 wherein the controller processing unit is configured to, in response to the signal from the execution unit, perform an operation, or trigger another processing unit to perform an operation, the operation comprising:
changing the allocation of data processor hardware units to a program or programs being executed by the execution unit; and/or
obtaining and/or providing performance and/or state information relating to the operation of the execution unit when executing the program.

17. The data processor of claim 10, wherein the data processor is a graphics processor.

18. A data processor, the data processor comprising:
an execution unit for executing instructions in a program to be executed by the data processor;
one or more hardware units associated with the execution unit and operable to execute instructions under the control of the execution unit;
the data processor further comprising:
processing circuitry operable to, when the data processor is executing a program comprising a sequence of instructions to be executed by the execution unit of the data processor, set for an instruction in the program that may be executed on a hardware unit, an indication that the instruction should be intercepted during its execution by the execution unit;
and wherein the execution unit is configured to:
when an instruction for execution by a hardware unit associated with the execution unit has associated with it an indication that the instruction should be intercepted during its execution by the execution unit, pause execution of the instruction and perform another operation,
wherein:
the program that is being executed by the execution unit comprises a command stream for controlling operation of the data processor, and the execution unit comprises a command stream execution unit of the data processor; and
the data processor comprises:
a controller processing unit operable to allocate respective hardware units of the data processor to command streams to be executed;
the controller processing unit being configured to:
determine whether a command stream to be executed has been allocated the required hardware units to execute its instructions; and
when a command stream has not been allocated the hardware units to execute instructions of a particular type, set an indication to indicate whether an instruction should be issued directly for execution by a hardware unit or should be intercepted during its execution by the execution unit for instructions of that particular type, to indicate that instructions of that particular type should be intercepted during their execution by the execution unit for the command stream;
and to
in response to the interception of an instruction of the particular type in the command stream:
stop execution of the command stream at the intercepted instruction and re-allocate hardware units of the data processor to the command stream; and
then cause the execution unit to resume execution of the command stream at the intercepted instruction after new hardware units have been allocated to the command stream.

19. A computer readable storage medium storing software code that when executed on a data processor performs a method of operating a data processor when executing a program comprising a sequence of instructions, the data processor comprising an execution unit for executing instructions in a program to be executed by the data processor, the execution unit being associated with one or more hardware units operable to execute instructions, and being operable to fetch and decode instructions for execution by the hardware unit or units, the method comprising:
for a program comprising a sequence of instructions to be executed by the execution unit of the data processor:
associating with at least one instruction in the program that may be executed on a hardware unit, an indication of whether the instruction should be issued directly for execution by a hardware unit or should be intercepted during its execution by the execution unit;
and
the execution unit:
when decoding the instruction for execution by a hardware unit in the program, determining from the indication associated with the instruction whether the instruction should be issued directly for execution by a hardware unit or intercepted during its execution by the execution unit;
and
in response to the determination, either:
issuing the instruction for execution by a hardware unit directly; or
pausing execution of the instruction and performing another operation;
wherein:
the program that is being executed by the execution unit comprises a command stream for controlling operation of the data processor, and the execution unit comprises a command stream execution unit of the data processor; and
a controller processing unit of the data processor is operable to allocate respective hardware units of the data processor to command streams to be executed; and
the method further comprises:
the controller processing unit:
determining whether a command stream to be executed has been allocated the required hardware units to execute its instructions; and
when a command stream has not been allocated the hardware units to execute instructions of a particular type, setting an indication to indicate whether an instruction should be issued directly for execution by a hardware unit or should be intercepted during its execution by the execution unit for instructions of that particular type, to indicate that instructions of that particular type should be intercepted during their execution by the execution unit for the command stream;
and
in response to the interception of an instruction of the particular type in the command stream:
stopping execution of the command stream at the intercepted instruction and re-allocating hardware units of the data processor to the command stream; and
then causing the execution unit to resume execution of the command stream at the intercepted instruction after new hardware units have been allocated to the command stream.

* * * * *